(12) United States Patent
Hong et al.

(10) Patent No.: US 8,024,813 B2
(45) Date of Patent: Sep. 20, 2011

(54) TASK INITIATED ACCOUNT PRESENTATION FOR RIGHTS ELEVATION

(75) Inventors: James H. Hong, Seattle, WA (US); Jonathan D Schwartz, Kirkland, WA (US); Michael G. Sheldon, Seattle, WA (US); Zeke B. Odins-Lucas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1463 days.

(21) Appl. No.: 11/276,715

(22) Filed: Mar. 10, 2006

(65) Prior Publication Data

US 2006/0242422 A1    Oct. 26, 2006

Related U.S. Application Data

(63) Continuation-in-part of application No. 11/112,747, filed on Apr. 22, 2005, now Pat. No. 7,617,530.

(51) Int. Cl.
*G06F 7/04* (2006.01)

(52) U.S. Cl. .......... 726/28; 713/168; 726/4; 726/17

(58) Field of Classification Search ............ 713/168, 713/201; 709/228, 223; 707/3
See application file for complete search history.

(56) References Cited

U.S. PATENT DOCUMENTS

| | | | |
|---|---|---|---|
| 5,369,764 A | 11/1994 | Blair | |
| 5,655,077 A | 8/1997 | Jones et al. | |
| 5,774,551 A | 6/1998 | Wu et al. | |
| 5,864,665 A | 1/1999 | Tran | |
| 6,017,177 A | 1/2000 | Lanham | |
| 6,209,100 B1 | 3/2001 | Robertson et al. | |
| 6,308,173 B1 | 10/2001 | Glasser et al. | |
| 6,473,794 B1 * | 10/2002 | Guheen et al. | 709/223 |
| 6,609,198 B1 | 8/2003 | Wood et al. | |
| 6,643,690 B2 | 11/2003 | Duursma et al. | |
| 6,651,166 B1 | 11/2003 | Smith et al. | |
| 6,651,168 B1 | 11/2003 | Kao et al. | |
| 6,795,855 B2 | 9/2004 | Bonilla et al. | |
| 6,799,178 B2 | 9/2004 | Iwase et al. | |
| 6,807,636 B2 | 10/2004 | Hartman et al. | |
| 6,901,512 B2 * | 5/2005 | Kurn et al. | 713/164 |
| 6,982,962 B1 | 1/2006 | Lunsford et al. | |
| 7,065,360 B2 | 6/2006 | Yahagi | |
| 7,152,164 B1 * | 12/2006 | Loukas | 713/188 |
| 7,178,025 B2 | 2/2007 | Scheidt et al. | |

(Continued)

FOREIGN PATENT DOCUMENTS

JP     2000122975 A     4/2000

(Continued)

OTHER PUBLICATIONS

"Using Spybot—Search & Destroy to remove Spyware from Your Computer", Mar. 25, 2004, Lawrence Abrams.*

(Continued)

*Primary Examiner* — Ponnoreay Pich
*Assistant Examiner* — John B King
(74) *Attorney, Agent, or Firm* — Lee & Hayes, PLLC

(57) ABSTRACT

Systems and/or methods are described that enable a user to elevate his or her rights. In one embodiment, these systems and/or methods detect a task which is not authorized for a user account. Responsive to detecting the task, the embodiment presents a different user account that is authorized to allow the task and information relating to the task.

17 Claims, 10 Drawing Sheets

U.S. PATENT DOCUMENTS

| | | | |
|---|---|---|---|
| 7,305,709 B1* | 12/2007 | Lymer et al. | 726/25 |
| 7,617,530 B2 | 11/2009 | Ruzyski et al. | |
| 2002/0031230 A1 | 3/2002 | Sweet et al. | |
| 2002/0038333 A1 | 3/2002 | Evans et al. | |
| 2002/0112155 A1 | 8/2002 | Martherus et al. | |
| 2002/0186260 A1 | 12/2002 | Young | |
| 2003/0046392 A1 | 3/2003 | Wen et al. | |
| 2003/0065626 A1 | 4/2003 | Allen | |
| 2003/0097574 A1 | 5/2003 | Upton | |
| 2003/0177388 A1 | 9/2003 | Botz et al. | |
| 2003/0182586 A1 | 9/2003 | Numano | |
| 2003/0212904 A1 | 11/2003 | Randle et al. | |
| 2004/0034704 A1 | 2/2004 | Connelly | |
| 2004/0039909 A1 | 2/2004 | Cheng | |
| 2004/0088405 A1 | 5/2004 | Aggarwal | |
| 2004/0117358 A1* | 6/2004 | von Kaenel et al. | 707/3 |
| 2004/0139355 A1 | 7/2004 | Axel et al. | |
| 2004/0210771 A1* | 10/2004 | Wood et al. | 713/201 |
| 2004/0243824 A1 | 12/2004 | Jones | |
| 2005/0091213 A1 | 4/2005 | Schutz et al. | |
| 2005/0108770 A1 | 5/2005 | Karaoguz et al. | |
| 2005/0132070 A1* | 6/2005 | Redlich et al. | 709/228 |
| 2005/0188313 A1 | 8/2005 | Matthews et al. | |
| 2005/0188314 A1 | 8/2005 | Matthews et al. | |
| 2005/0188317 A1 | 8/2005 | Matthews et al. | |
| 2005/0235148 A1 | 10/2005 | Scheidt et al. | |
| 2005/0268107 A1 | 12/2005 | Harris et al. | |
| 2006/0074633 A1* | 4/2006 | Mahesh et al. | 704/9 |
| 2006/0075475 A1 | 4/2006 | Boulos et al. | |
| 2006/0085752 A1 | 4/2006 | Beadle et al. | |
| 2006/0165060 A1 | 7/2006 | Dua | |
| 2006/0174308 A1 | 8/2006 | Fuller et al. | |
| 2006/0174323 A1 | 8/2006 | Brown et al. | |
| 2006/0242427 A1 | 10/2006 | Ruzyski et al. | |
| 2007/0033191 A1 | 2/2007 | Hornkvist et al. | |
| 2007/0106892 A1 | 5/2007 | Engberg | |
| 2007/0180502 A1 | 8/2007 | Yadav et al. | |
| 2007/0186106 A1 | 8/2007 | Ting et al. | |
| 2007/0198933 A1 | 8/2007 | van der Bogert et al. | |

FOREIGN PATENT DOCUMENTS

| | | |
|---|---|---|
| JP | 2003223235 A | 8/2003 |
| JP | 2004295632 A | 10/2004 |
| RU | 2158444 C2 | 10/2000 |
| WO | WO0111451 A1 | 2/2001 |

OTHER PUBLICATIONS

Rathbone, "Windows XP for Dummies", Wiley Publishing Inc, 2001, pp. 62-64, 66, 106-107, 128 and 314.

Debian Admin, "Enable and Disable Ubuntu Root Password", Sep. 28, 2006, <<http://www.debianadmin.com/enable-and-disable-ubuntu-root-password.html>>.

Debian Administration, "Giving ordinary user root privileges, selectively.", Oct. 16, 2004, retrived at <<http://www.debian-administration.org/articles/33/print>>.

Direct User Switching Task for Windows XP, Aug. 24, 2003, retrived at <<http://web.archive.org/web/20030824072430/www.waybeyonduk.com/DUST/>>.

"GKSU: A gtk+ su front end Linux Man Page" retrived at <<http://www.penguin-soft.com/peguin/man/1/gksu.html>>.

Ha, "Red Hat Linux Getting Started Guide", Apr. 8, 2003, Red Hat, Incorporated, retrived at <<http://web.archive.org/web/20030418075045/http://www.redhat.com/docs/manuals/linux/RHL-p-Manual/getting-started-guide/.>> pp. #35, pp. #74-75, pp. #105, pp. #146.

Ha, "Red Hat Linux Security Guide", Red Hat Docs, Apr. 8, 2003, retrived at <<http://web.archive.org/web/20030418075045/http://www.redhat.com/docs/manuals/linux/RHL-9-Manual/getting-started-guide/.>> pp. #26-pp. #28.

Lawrence, "Using Sudo", Linus Tutorials, May 12, 2005, retrieved at <<http://web.archive.org/web/20050530041932/www.developertutorials.com/tutorials/linux/using-sudo-050511/page1.html>>.

Learning the shell, "Permissions", retrived at <<http://www.linuxcommand.org/lts0070.php>>.

Linuxtopia, "Ubuntu FAQ Guide: Chapter 6—Users Administration", May 31, 2005, retrieved on <<http://web.archive.org/web/20060523005037/http://linuxtopia.org?online_books/system_administration_books/ubuntu_starter_guide/index.html>>.

Man Pages, "Ls.", retrived at <<http://www.linuxcommand.org/man_pages/ls1.html>> on Apr. 9, 2009.

Microsoft help and Support, "How to make files and folders private in Windows XP so that only you have access to them", retrived at <<http://support.microsoft.com/kb/930987/en-us>>.

Miller, "Sudo Manual", Jul. 11, 2004 retrived at <<http://web.archive.org/web/20040711020526/http://www.gratisoft.us/sudo/man/sudo.html>>.

Miller, "Sudoers Manual", Jul. 11, 2004, retrived at <<http://web.archive.org/web/20040711020555/www.gratisoft.us/sudo/man/sudoers.html>>.

Quick HOWTO: Ch09 : Linxus Users and Sudo, Dec. 23, 2005, retrived at <<http:web.archive.org/web/20060203023004/http://www.linuxhomenetworking.com/wiki/index.php/Quick_HOWTO_:_Ch09_:_Linux_Users_and_Sudo>>.

Sweet et al., "KDE 2.0 Development: 5.3. STandard Dialog Boxes", 2000, retrieved at <<http://developer.kde.org/documentation/books/kde-2.0-development/index.html>>.

The Elder Geek on Windows XP, "Switch User in Windows XP", retrieved at <<http://web.archive.org/web/20041215071735/theeldergeek.com?HT0_005.htm>>.

"The KDE su Command", Nov. 20, 2004, retrieved on <<http://www.linfo.org/kdesu.html>>.

"The Ubuntu Quick Guide. Chapter 3. Applications Menu: System Tools.", retrieved on <<http://people.ubuntu.com/~mako/docteam/quickguide/ch03s07.html>>.

Ubuntu Documentation RootSudo, Dec 31, 2005, retrieved at <<https://help.ubuntu.com/community/RootSudo>>.

Using Windows XP, Computer Setup and Maintenance, "How to swtich between users" Sep. 7, 2006, retrived at <<http://www.microsoft.com/windowsxp/using/setup/winxp/switchusers.mspx>>.

Gamma, E. et al., "Design Patterns", 1995, Addison-Wesley, Reading, MA, USA, pp. 139-143, 148-150.

Pittaway, et al., "Distributed security services in Microsoft Windows NT 5.0—Kerberos and the active directory", Information Security Technical Report, Elsevier Advanced Technology, vol. 4, 1999, pp. 20-21.

Wiseman, et al., "Adding Security Labelling to Windows NT", Information Security Technical Report, Elsevier Advanced Technoloy, vol. 4, 1999, p. 20-21.

European Search Report for European Patent Application No. 04019100.9 Mailed on Feb. 8, 2008 (5 pages).

Andress et al., "Test Center—New Products Test In Real-World Enviroments", Trinity 3.3, Information Security Magazine, Jan. 2002. Retrieved from the Internet.

Lai, et al., "User Authentication and Authorization in the Java Platform", INSPEC, 1999, pp. 285-290.

Barkley, "Principle of Least Privilege", retrieved on Oct. 16, 2009 at <<http://hissa.nist.gov/rbac/paper/node5.html>>, National Institute of Standards and Technology, Jan. 9, 1995, 1 page.

"How to Use the Fast User Switching Feature in Windows XP", retrieved on Oct. 16, 2009 at <<http://web.archive.org/web/20041212131045/http://support.microsoft.com/kb/279765>>, Microsoft Help and Support, Jul. 15, 2004, pp. 1-3.

Ha, "Red Hat Linux 9: Red Hat Linux Customization Guide", Red Hat Docs, Apr. 8, 2003, Red Hat Incorporated, Retrieved from the internet at http://www.redhat.com/docs/manuals/linux/RHL-9-Manual/custom-guide on Apr. 2, 2010, 3 pages.

Habraken, "Novell Linux Desktop 9 User's Handbook", Novell Press, 2005, pp. #32-pp. #34, pp. #151-pp. #153.

Microsoft Computer Dictionary, "Accelerator, Hot Keys, and Shift Key", Microsoft Press 2002.

* cited by examiner

US 8,024,813 B2

TASK INITIATED ACCOUNT PRESENTATION FOR RIGHTS ELEVATION

PRIORITY

This patent application is a continuation-in-part of, and claims priority from, a patent application having application Ser. No. 11/112,747, filed on Apr. 22, 2005, and titled "Rights Elevator".

TECHNICAL FIELD

This invention relates to elevating a computer user's rights.

BACKGROUND

Generally, two types of accounts are used to log a user on to a computer's operating system. One has nearly unlimited rights, often called an administrator account, the other has limited rights, often called a standard user account.

Standard user accounts permit some tasks but prohibit others. They permit most applications to run on the computer but often prohibit installation of an application, alteration of the computer's system settings, and execution of certain applications. Administrator accounts, on the other hand, generally permit most if not all tasks.

Not surprisingly, many users log on to their computers with administrator accounts so that they may, in most cases, do whatever they want. But there are significant risks involved in using administrator accounts. Malicious code may, in some cases, perform whatever tasks are permitted by the account currently in use, such as installing and deleting applications and files—potentially highly damaging tasks. This is because most malicious code performs its tasks while impersonating the current user of the computer—thus, if a user is logged on with an administrator account, the malicious code may perform dangerous tasks permitted by that account.

To reduce these risks a user may instead log on with a standard user account. Logging on with a standard user account may reduce these risks because the standard user account may not have the right to permit malicious code to perform many dangerous tasks. If the standard user account does not have the right to perform a task, the operating system may prohibit the malicious code from performing that task. For this reason, using a standard user account may be safer than using an administrator account.

But the user may be prohibited from performing legitimate tasks—like installing a file known to be safe. To install this file, the user may need to switch to an account that has a right to permit the task. To do so with relative safety, the user may need to log off from the standard user account, log on to an administrator account, install the file, log off from the administrator account, and then log back on with the standard user account. This is disruptive.

To reduce this disruption, a user's rights may temporarily be elevated to permit a desired task. The user's rights may be elevated to those corresponding to rights held by an administrator account, for instance. In some cases, a dialog box pops up on the user's screen when an impermissible task is requested by an application. This dialog box often has two empty fields; one for typing in an account name (e.g., an administrator account) and another for typing in a password. Thus, a user may temporarily use the privileges of the selected account so that the task may be run to completion. Once the task is completed, the rights of the user may then return to those of his or her account such that these temporary privileges cease.

But to elevate his or her rights to perform a task, the user will often need to find or remember an administrator account name. This may be disruptive; a user may need to call someone to figure out the name, find some scrap of paper somewhere on which the user wrote it down some time ago, and the like. Also, the user may need to type the name in. Typing a relatively simple account name may, on its own, be a disruption. But many account names are complex, having a mix of letters, numbers, symbols, and lower- and upper-case characters. These names may cause a further disruption because they may require that the user type slowly and carefully. Thus, searching for and typing in an account name to elevate rights may disrupt the user's workflow on the computer, especially if the user needs to elevate his or her rights often throughout the day.

SUMMARY

Systems and/or methods ("tools") are described that enable a user to elevate his or her rights. In one embodiment, these systems and/or methods detect a task which is not authorized for a user account. Responsive to detecting the task, the embodiment presents a different user account that is authorized to allow the task and information relating to the task.

BRIEF DESCRIPTION OF THE DRAWINGS

The same numbers are used throughout the disclosure and figures to reference like components and features wherever feasible.

DETAILED DESCRIPTION

Overview

The following disclosure describes one or more tools enabling a user to elevate his or her rights. In one embodiment, the tools present a user interface to a user whereby the user may elevate his or her rights without having to search for or type in an account name. This user interface may be presented in response to a request to perform a task requiring a right not permitted by the user's current account. In some cases, for example, the tools determine which accounts have rights sufficient to enable a user to perform a task not permitted by a user's current account. The tools may then present these accounts and enable the user to select and submit an authenticator for one of these accounts.

The tools may also present task-related information that can assist the user in deciding whether to elevate his or her rights via an authorized account. For instance, the tools may present information regarding an entity (e.g., program) attempting to implement the task and/or a location of the entity among other information. In some instances the tools may gather the information and evaluate the information, such as for trustworthiness. For example, information supplied by a third party may be deemed more trustworthy than information obtained from the entity requesting to implement the task. In some such cases, the tools may present the more trustworthy information to the user and not present less trustworthy information. Various examples are described below for facilitating a user's rights elevation consent decision.

Exemplary Operating Environment

Before describing the tools in detail, the following discussion of an exemplary operating environment is provided to assist the reader in understanding where and how the tools may be employed. The description provided below constitutes but one example and is not intended to limit application of the tools to a particular operating environment.

Figure 1:
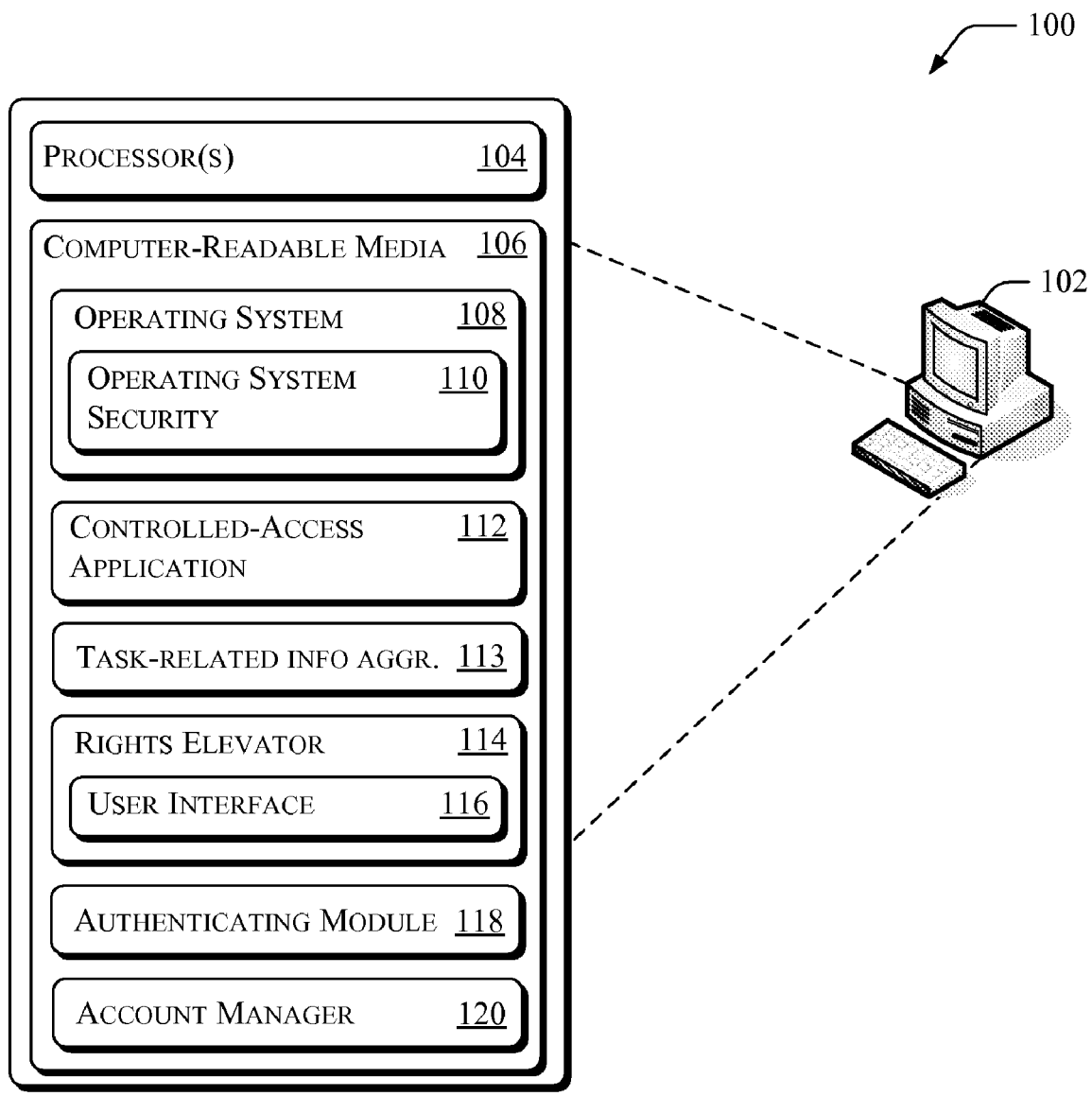
FIG. 1 illustrates an exemplary operating environment in which various embodiments can operate.

FIG. 1 illustrates one such operating environment generally at 100 comprising a computer 102 having one or more processor(s) 104 and computer-readable media 106. The processor(s) are capable of accessing and/or executing the computer-readable media. The computer-readable media comprises an operating system 108 having an operating system security 110, a controlled-access application 112, a task-related information aggregator 113, a rights elevator 114 having a user interface 116, an authenticating module 118, and an account manager 120.

Operating system 108 is capable of managing applications and tasks on computer 102. The operating system comprises operating system security 110, which is capable of determining whether a task is permitted by a user's current account and, if it is not, prohibiting that task from being performed. Computer 102 may also comprise controlled-access application 112. This application is capable of prohibiting tasks that may otherwise be permitted by a user's current account. One example of the controlled-access application is parental control software designed to prohibit specific tasks when a child is using the computer, such as a task to display a certain website, run a certain application, or perform any task during a certain time of day.

Task-related information aggregator 113 can request and/or receive information relating to the prohibited task. The task-related information can be any information which can be utilized by system components and/or a user in deciding whether to authorize the prohibited task. For instance, the task-related information aggregator may request information relating to a name of an entity requesting to perform the task. In another example, the task-related information aggregator may request information relating to a location of the entity. Other examples of aggregated information can include a publisher of the requesting entity, and/or whether the requesting entity is signed and certified. As an aspect of aggregating the task-related information, the task-related information aggregator further may, itself or via another system component, evaluate a degree of reliability or trustworthiness of the information that it obtains. For instance, the task-related information may be evaluated as to whether the requesting entity has a known publisher and/or is signed and authenticated to determine trustworthiness. Though not described in detail herein, the skilled artisan should recognize various tools employed by operating systems to authenticate entities. One such technique involves comparing a hash from the entity to a hash obtained from the entity's publisher. Such a hash comparison technique serves to determine whether the entity's content has been altered from its original form. Such alteration could be an indication that malicious code has been inserted into the entity.

Rights elevator 114 is capable of elevating a user's rights; including permitting a task that is prohibited by a current user's account or the controlled-access application. The rights elevator may enable a user to elevate his rights from that of a limited-rights account, such as a standard user (e.g., non-admin) account, to a higher-rights account, such as an administrator account. The rights elevator may enable the user to elevate his or her rights through user interface 116, such as by presenting a name of a higher-rights account and enabling submission of an authenticator for that account. The rights elevator 114 may also receive some or all of the task-related information obtained by the task-related information aggregator 113. The rights elevator may present some or all of this information on user interface 116 to aid the user in deciding whether to elevate his or her rights.

Authenticating module 118 is capable of authenticating a selected account, such as by determining that a selected higher-rights account is submitted with an authentic password or other authenticating credential. Account manager 120 comprises information sufficient to determine what user accounts are available and the rights of those accounts.

Various embodiments of these elements, and particularly how these elements act and interact to perform an exemplary process and produce an exemplary user interface, are set forth in greater detail below.

Exemplary Embodiments for Elevating Rights

When a user is logged onto a computer with an account having limited rights, some tasks may be prohibited based on the user's current privilege context. If a user's current account does not permit a task, such as one requested by a software application or another by the user himself, the operating system may prohibit that task. In some cases this is advantageous, such as when the task requested is requested by malicious code. Also, whether the user's account permits the task or not, other software, such as controlled-access application 112, may act to prohibit that task from being performed. The following discussion describes exemplary ways in which elements of operating environment 100 enable an individual to elevate his or her rights, including permitting a delayed or previously prohibited task.

Figure 2:
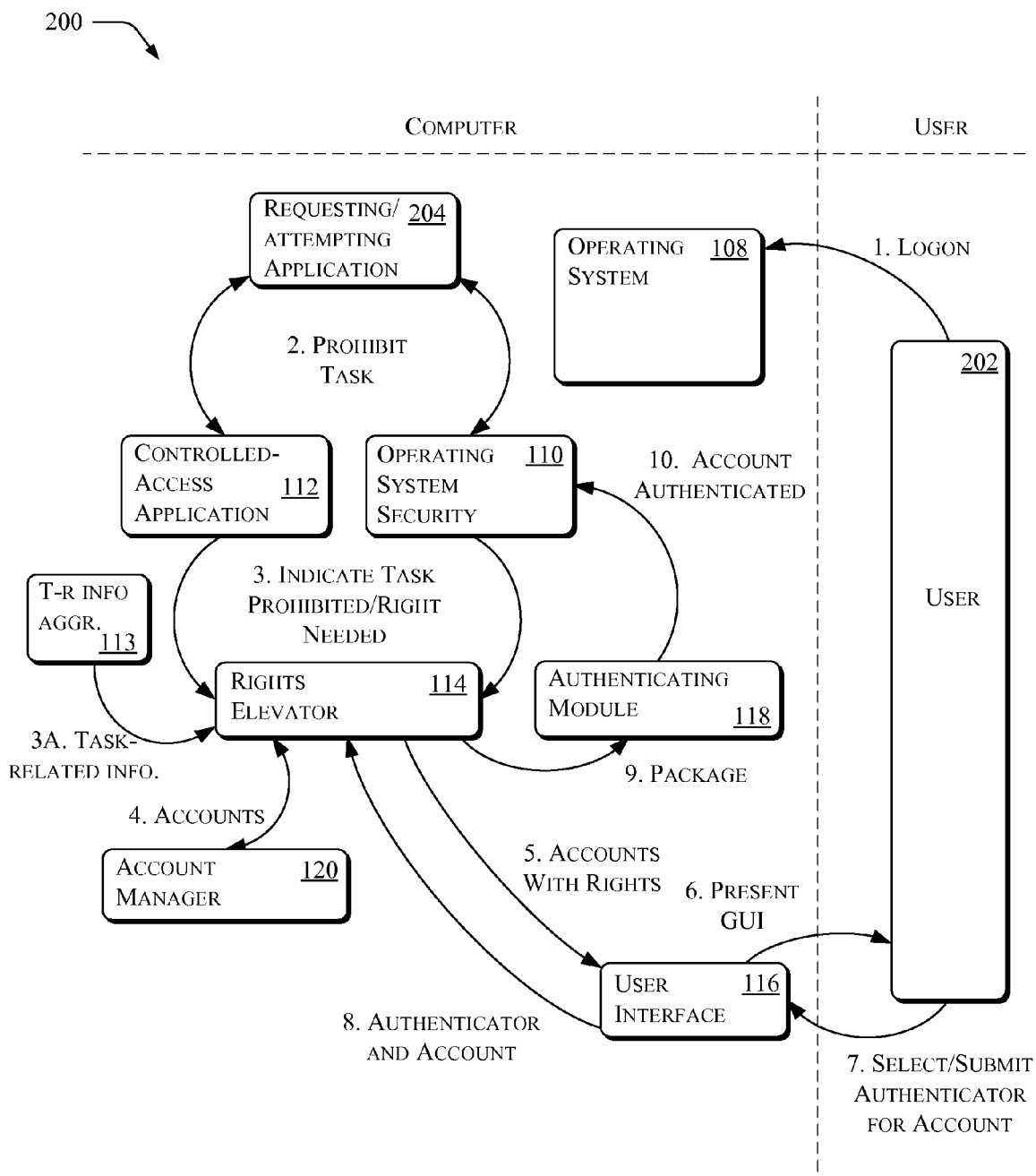
FIG. 2 is a flow diagram of an exemplary process for enabling a user to elevate lights.

Referring to FIG. 2, an exemplary flow diagram 200 for enabling a user to elevate rights is shown. Flow diagram 200 illustrates a set of actions by, and accompanying communications between, elements of the environment 100, a user 202, and an application 204. The elements shown are operating system 108, operating system security 110, controlled-access application 112, task-related information aggregator 113, rights elevator 114, user interface 116, authenticating module 118, and account manager 120. The actions and accompanying communications are marked with arrows. The flow diagram is oriented showing computer actions and user actions, communication between the computer and the user represented by lines passing through a dashed line separating the two. This flow diagram may be implemented in any suitable hardware, software, firmware, or combination thereof In the case of software and firmware, this diagram represents sets of operations implemented as computer-executable instructions.

At arrow 1, user 202 logs into operating system 108 with an account having limited rights. The account's limited right to perform tasks may be enforced by operating system security 110 and/or controlled-access application 112.

After the user logs onto the computer, a task is requested or attempted by application 204. The task may be initiated with or without the user's interaction. The user may have initiated, directly or indirectly, the task being attempted, such as by attempting to install an application downloaded over the Internet. In this case application 204 may be a download module, network browser, file manager, or the like. In other cases, the user may not have initiated the task, such as is often the case when malicious code requests or attempts a task.

At arrow 2, operating system security 110 and/or controlled-access application 112 prohibits the task from being performed. In one embodiment, the controlled-access application intercepts the task prior to it being performed, checks the task against the rights of user 202's current account, determines that the task is not permitted, and prohibits the task from being performed. In another configuration, the operating system security performs this operation.

At arrow 3, the operating system security and/or controlled-access application communicate with rights elevator 114, indicating that a task has been prohibited and/or that a right is needed. In some cases, one of these applications 110, 112 communicates to the rights elevator the type of task, what type of rights are needed in order to permit the task, and/or the type of account needed to permit the task (e.g., an unlimited rights account).

At arrow 3A, the task-related information aggregator 113, supplies task-related information to the rights elevator 114. In some configurations, the task-related information aggregator passes whatever task-related information that it obtains to the rights elevator. In other instances, some sort of evaluation is performed on the obtained task-related information. In some of these cases, most or all of the task-related information is supplied to the rights elevator along with some indication of the evaluation results. For instance, one piece of information may be a user-friendly name of the requesting entity, say hypothetically "Windows update download". In a first example where the user-friendly name is obtained from the entity itself the user friendly name may be forwarded to the rights elevator with a caveat that the information may be untrustworthy. In a second example where the user-friendly name is obtained from a third party and is signed and authenticated, the same user-friendly name may be forwarded to the rights elevator with an indication that the information is trustworthy.

Other configurations of the task-related information aggregator 113 may only forward evaluated task-related information which meets a certain degree of trustworthiness. For instance, such configurations may not forward the user-friendly name in the above example where the information is obtained from the entity itself, but would forward the information in the second scenario where the information is obtained from a third party and is signed and authenticated.

At arrow 4, rights elevator 114 determines which accounts, if any, have rights sufficient to permit the prohibited task. The rights elevator may do so, in one embodiment, by communicating with account manager 120, such as by passing a flag for accounts having unlimited rights according to an application program interface (API). By so doing, the rights elevator may find, receive, or determine indicators or other identifying information sufficient to enumerate one or more of these accounts. The account manager may return all accounts having sufficient rights to permit the prohibited task, such as all administrator or other nearly unlimited-rights accounts, and/or other accounts explicitly marked for presentation to a user.

At arrow 5, rights elevator 114 communicates accounts having sufficient rights to user interface 116. These accounts are those capable of permitting a task that is not permitted by the user's current privileges. The rights elevator may communicate these accounts by passing a flag to the user interface with information sufficient to identify the accounts, such as with names, icons, and the like. The rights elevator may also communicate some or all of the task-related information obtained at arrow 3A for presentation on user interface 116.

At arrow 6, user interface 116 presents a graphical user interface (GUI) to the user having at least one account with rights sufficient to permit the prohibited task. The graphical user interface may comprise one, many, or all accounts having sufficient rights. In some cases all of the accounts may be so many as to be cumbersome. In these cases, the user interface and/or rights elevator may select which to present based on various criteria, such as frequency of use, those associated with the current user, those with sufficient but not unlimited rights, and the like.

The accounts so presented may be identified to the user, thereby permitting the user to know which account is which. One potential benefit of this is that the user, by knowing which account is which, may select one without having to find or type in the name of the account. The accounts may be identified with graphics (e.g., graphic tiles or icons), text (e.g., a name of each account), and the like. Along with the user accounts, the user interface may present the information about the task. In some configurations, the user interface may simply present whatever task-related information is available to the user. In other configurations, the user interface may present the task-related information in a manner intended to further aid the user in whether to authorize rights elevation.

In one such example, user interface 116 may package the task-related information in a manner which is user-friendly or easily discernable to the user. For instance, if the task-related information has been evaluated for trustworthiness, the user-interface may utilize some type of textual and/or non-textual indication of the relative trustworthiness of the information presented. In some cases, the user interface may utilize color and/or symbol association to readily convey the degree of trustworthiness to the user. For instance, in a simple example, information assigned a high degree of trustworthiness may be highlighted in green, information assigned a medium level of trustworthiness may be highlighted with yellow, and information assigned a low level of trustworthiness may be highlighted with red. Another example may place a 'caution' sign or symbol next to information that is deemed to have a low level of trustworthiness or where a level of trustworthiness of the information has not been determined. Other examples will be described in more detail below in relation to FIGS. 8-11.

Figure 3:
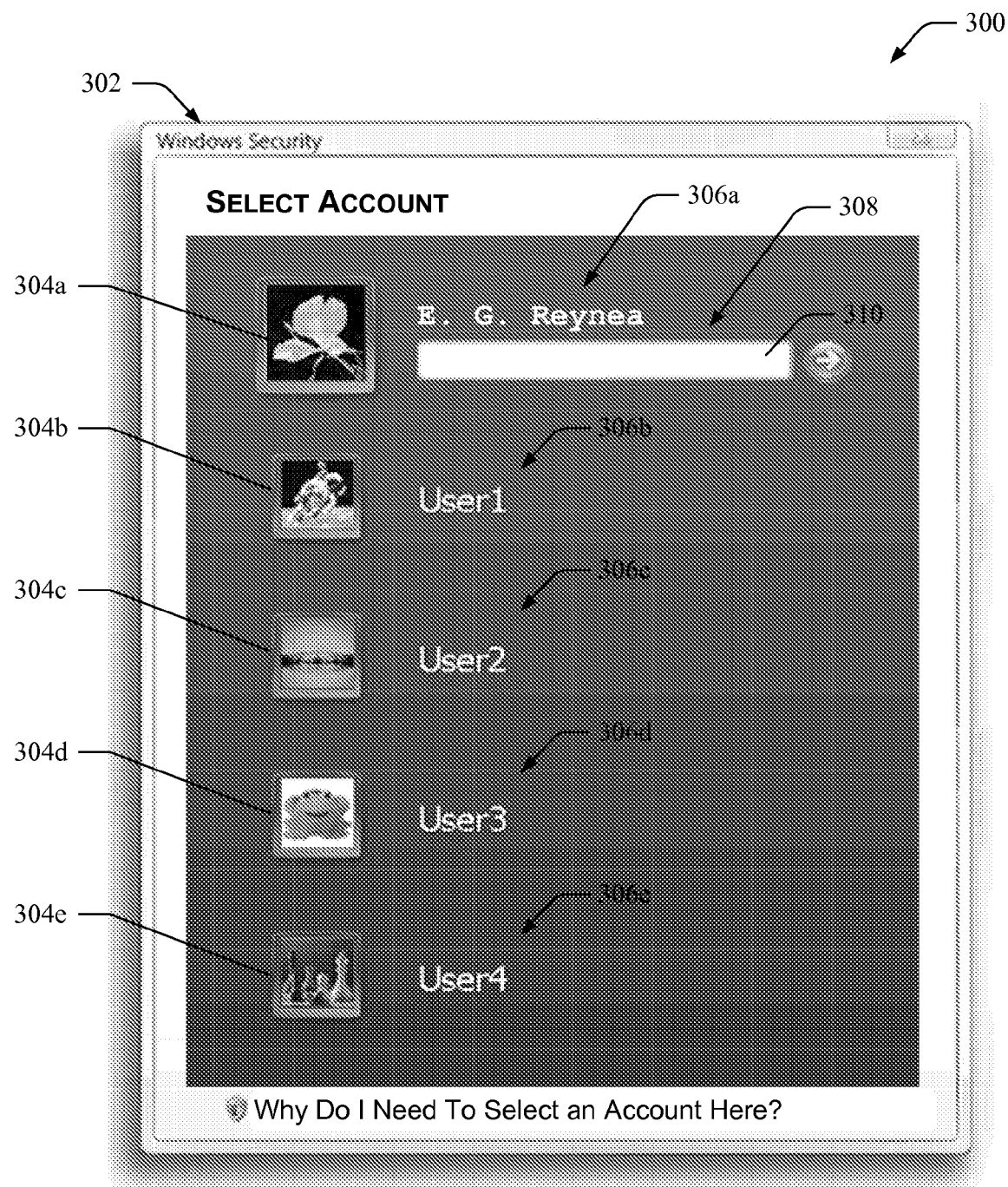
FIG. 3 illustrates an exemplary graphical user interface having multiple accounts.

Referring to FIG. 3, a screen shot 300 showing graphical user interface 302 is shown. Five accounts having sufficient rights are shown, each with a graphic region 304 (labeled 304a, 304b, 304c, 304d, and 304e) and a name region 306 (labeled 306a, 306b, 306c, 306d, and 306e). Each of the graphics may indicate the account or a user associated with that account. Thus, if an account's graphic represents the information technology department's on-call technician, for instance, the user may know to contact that technician for a password or other help. If, on the other hand, different graphics represent different parents or guardians of a child using a computer, the child may know which parent to ask for a password to perform the prohibited task and which password field to type in that password (if multiple fields are shown). The name regions comprise names identifying the accounts, here "E. G. Reynea", "User1", "User2", "User3", and "User4".

The graphical user interface also permits a user to submit an authenticator for an account. In one embodiment, each of the accounts has an associated authenticator region. This permits a user to enter a password or other authenticator for an account and, by so doing, also select that particular account.

In the illustrated embodiment, the graphical user interface comprises a single authenticator region 308 having a data-entry field 310 for entry of a password. In this case, a user may select an account, such as by clicking on a graphic in graphic region 304a or text in name region 306a for the "E. G. Reynea" account. The user may then type a password into data-entry field 310 of authenticator region 308. This data-entry field may exist prior to a user's selection of an account; in this case a user's selection indicates to which account the user wants to associate a password input to the field. In this embodiment, however, user interface 116 presents authenticator field 308 near an account once that account is selected.

Figure 4:
FIG. 4 illustrates an exemplary graphical user interface having a single account.

Referring to FIG. 4, an exemplary single-account graphical user interface 402 is shown. In this embodiment, an account 404 having sufficient rights to permit the prohibited task is shown with two identifiers. The first identifier, that of the current user's picture 406 at graphic region 408, identifies the person associated with the account. The second identifier, that of the account's name, entitled "Abby Salazar" and shown at name region 410, identifies the person associated with the account and the account itself.

This account may have the same name and identifier as that of the user's current, limited-rights account. It also may be authenticated with the same authenticator (e.g., password) as used for the user's current limited-rights account. Thus, if a user's current, limited-rights account name is "Abby Salazar" (shown at 410) and password is "Abby" (not shown), the user may elevate her rights to permit the prohibited task simply by entering "Abby" into authenticator field 412. Also, the user does not need, in this case, to remember an account that she has not recently used because the account and password are the same as the ones she entered at arrow 1 to logon to the operating system.

This may be enabled in various ways. In one case, there are two accounts, one with limited rights and one with higher or unlimited rights. Each account has the same name and password, but the higher-rights account is not available for logging into at arrow 1 (when logging onto the operating system). The higher-rights account, however, is made available by the rights elevator by virtue of its having sufficient rights to permit the prohibited task. Conversely, the limited-rights account may not be presented by virtue of it not having sufficient rights.

In another embodiment, there is one account having two tags; one tag is associated with limited rights and one tag is associated with higher rights. By default the account may be tagged with the limited-rights tag when logging in. This tag may be altered by the rights elevator on entry of the user's password in the graphical user interface, such as into field 412 of FIG. 4.

Also, user interface 116 may provide information about the task and/or what entity requested or attempted to perform the task. In the illustrated embodiment of FIG. 4, a help graphic 414 is shown, entitled "Why do I need a password here?". Responsive to selecting this help graphic, the user interface may describe the task, the entity and/or other information related to the task. In this example, task-related information is displayed upon a user request (e.g., the user clicking on graphic 414). In other examples, task information is automatically displayed in the graphical user interface. Further examples are described below in relation to FIGS. 8-11.

Referring again to FIG. 2, at arrow 7, user interface 116 receives the user's selection of and/or authenticator for an account. At arrow 8, the user interface sends the account and authenticator to be authenticated. In the illustrated embodiment, the user interface sends an indication of the account selected and an authenticator for that account to the rights elevator. Continuing the illustrated embodiment shown in FIG. 4, the user may enter password "Abby", after which the user interface sends "Abby" and "Abby Salazar" to the rights elevator.

Referring again to FIG. 2, at arrow 9, rights elevator 114 packages the authenticator and associated account and communicates these to authenticating module 118. In one embodiment, this package is a computer-readable package with the authenticator and the account associated with the authenticator, all in a format readable and analyzable by the authenticating module. In another embodiment, the authenticating module is part of and integral with operating system security 110 or controlled-access application 112.

At arrow 10, the account is authenticated (or not authenticated). If it is not authenticated, rights elevator 114 and user interface 116 may repeat arrows 5, 6, 7, 8, and/or 9 until the account is authenticated at arrow 10. The authentication of the account may be communicated to the entity prohibiting the task, such as operating system security 110, shown in FIG. 2.

Following performance of or permission to perform the prohibited task, rights elevator 114 may return to the user to his or her limited-rights account. In at least this sense the elevation of rights may be temporary. The rights elevator may also immediately reduce the rights (and thus the account to the limited account) or tie the elevated right to just the prohibited task. In this case, only the prohibited task may be permitted by elevating the rights of the user. This may help to reduce security risks inherent in the rights of the user being elevated for too long. It also may reduce the risk of a task being performed that is not permitted by the user's limited-rights account without the user elevating his or her rights specifically to permit that task.

Unlocking a Task

Various applications may call rights elevator 114 to enable a user to elevate his or her rights. This may be indirect, such as when an application attempts to perform a task that is prohibited by an operating system. It may also be direct, such as when an application—even if it has not yet attempted a task—calls the rights elevator to enable a user to elevate his or her rights. Protocols (e.g., APIs) followed to call the rights elevator and its user interface may be public, thereby enabling various applications to call the rights elevator without first attempting a prohibited task.

In the following exemplary embodiment, an application responsible for presenting and altering a system's date and time settings calls rights elevator 114 (e.g., requesting/attempting application 204 of FIG. 2). This application calls the rights elevator responsive to a user selecting to unlock the date and time of an operating system. The task of altering the system's date and time may not be one currently permitted by the user's rights.

Figure 5:
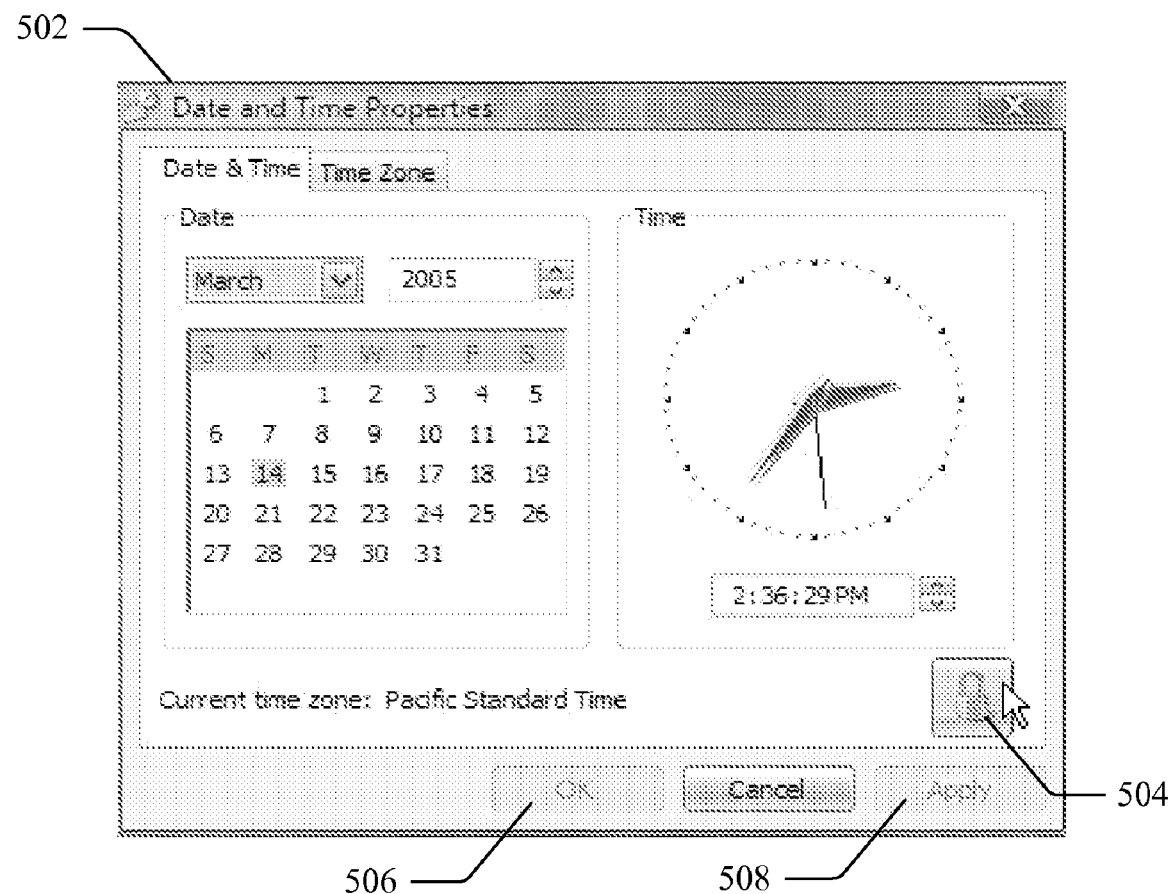
FIG. 5 illustrates an exemplary date and time dialog having an unlock button.

Referring to FIG. 5, a date and time dialog 502 having an unlock button 504 is shown. This unlock button prompts a user interface through which a user may select to unlock a task. Dialog 502 presents the date and time to the user but does not permit the user to alter the date or time. This prohibition is indicated by "OK" and "Apply" buttons 506 and 508 being un-selectable, as well as the presence of the unlock button showing a locked padlock icon. A user may select to elevate his or her rights by clicking on unlock button 504.

In response to this selection, the dialog generates a call to rights elevator 114. This call may follow a published API. The call indicates to the rights elevator that the user's rights may need to be elevated. This is one example of an application (such as application 204 or system security 110 of FIG. 2) communicating with rights elevator 114, similar to the acts set forth above at arrow 3. Responsive to the call, task-related information aggregator 113 gathers information related to the task and supplies some or all of the information to rights elevator 114 as indicated at arrow 3A.

Responsive to receiving this call, the rights elevator presents a graphical user interface enabling the user to elevate his or her rights. The rights elevator may do so similarly to as set forth above, such as by performing acts described at arrows 4, 5, and 6 (along with user interface 116).

Figure 6:
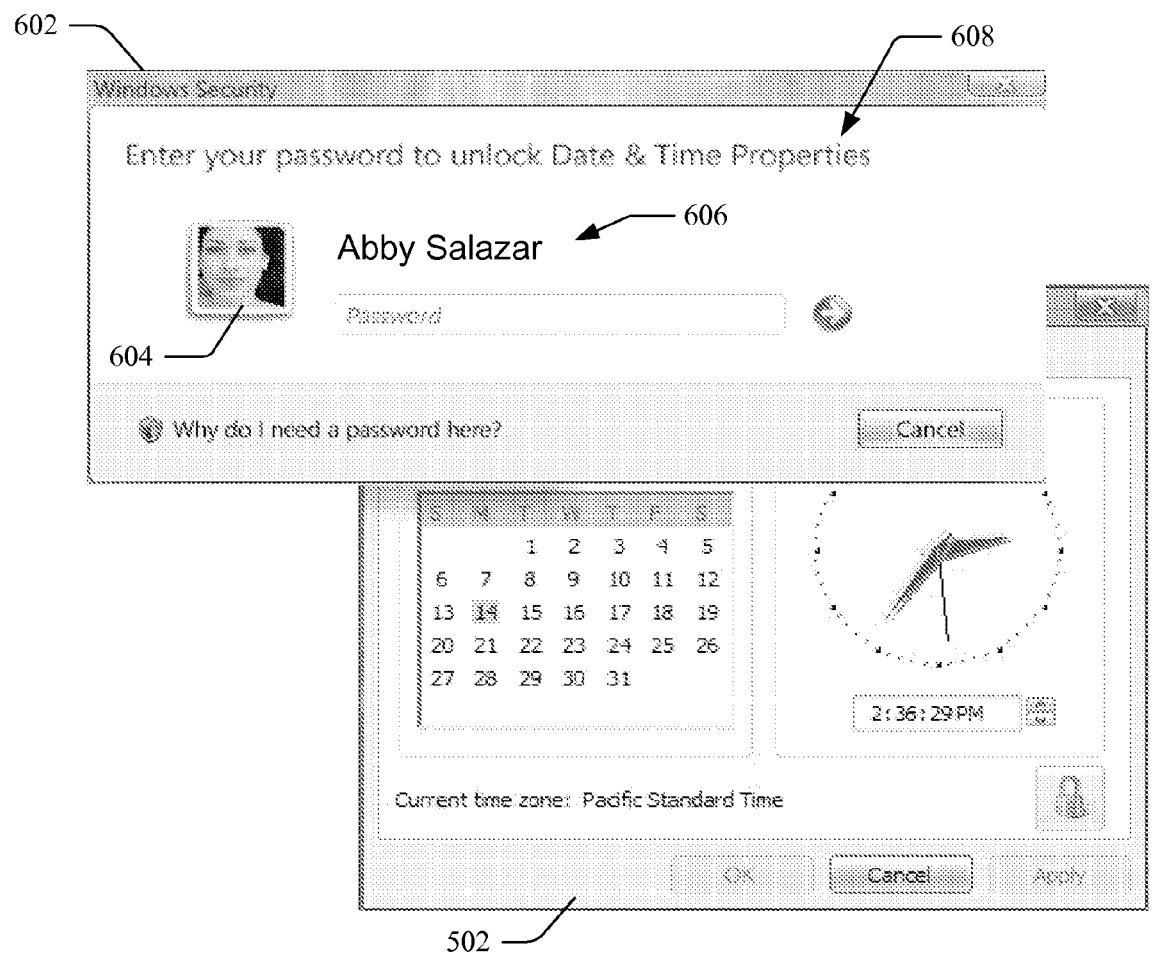
FIG. 6 illustrates an exemplary user interface showing one account having sufficient rights to unlock a task.

Referring to FIG. 6, an exemplary user interface 602 is shown. This user interface shows one account having sufficient rights to unlock the task. Two identifiers are used for this account, a user's picture 604 and the account's name, entitled "Abby Salazar", shown at 606. The user interface permits the user to submit an authenticator for the account, here with a password. This is indicated by a description 608 of what is needed to unlock the task: "Enter your password to unlock Date & Time Properties".

In this particular instance, description 608 conveys task-related information to the user. Specifically, the information indicates to the user that the rights elevation request relates to a task of updating date and time properties. This information can aid the user in his/her determination whether to authenticate the present rights elevation request. In this example, the information provided is consistent with the user's actions (e.g., the user just initiated the change date and time process). However, consider another scenario where a user has not initiated such a process and user-interface 602 appears. The user can contemplate the task-related information in deciding whether to authorize the rights elevation.

In the present example, where the user initiated the date and time change and authorizes the rights elevation, responsive to receiving the user's password for an account, the user interface forwards the account and password for authentication by authenticating module 118 of FIG. 1. This may be performed with the actions described as part of arrow 8 and/or 9 of FIG. 2.

Responsive to the account being authenticated, the application responsible for the system's date and time presents a user interface showing the user that the task is unlocked.

Figure 7:
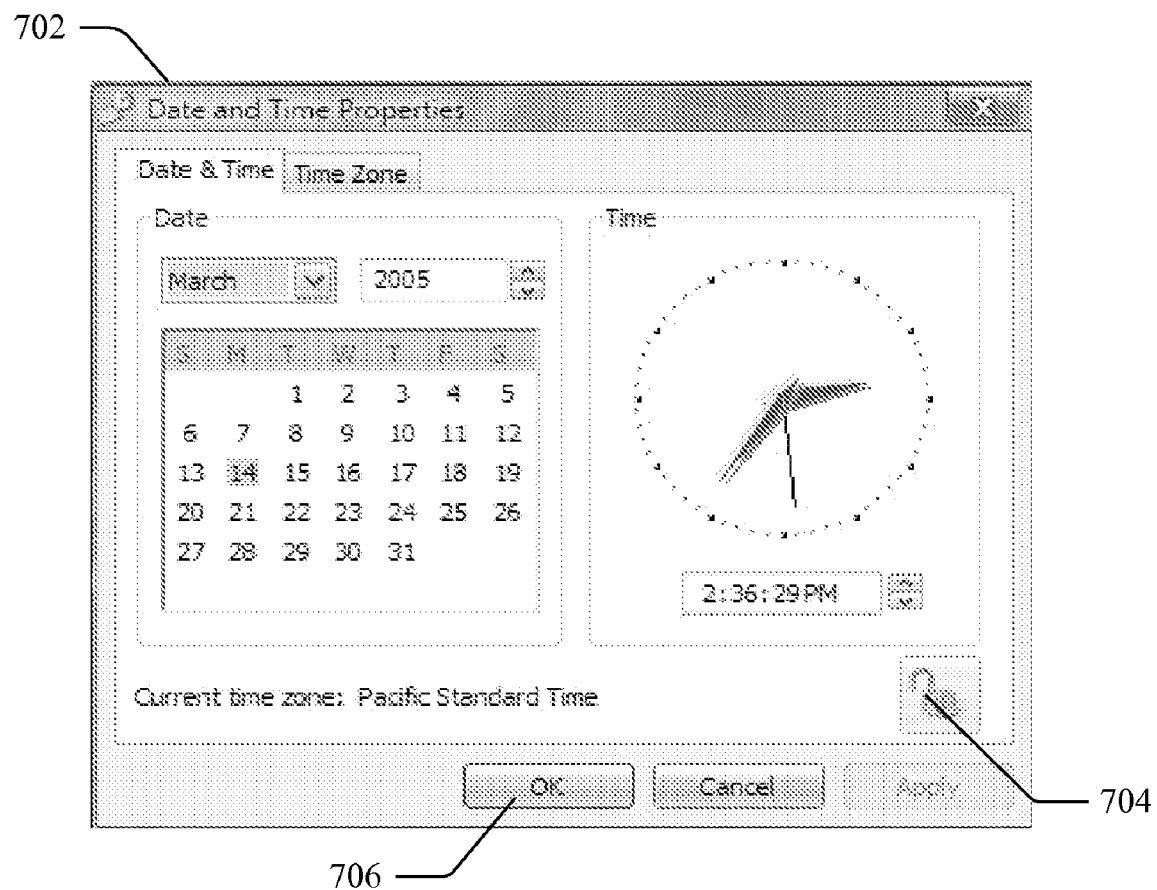
FIG. 7 illustrates an exemplary unlocked task dialog.

In FIG. 7, an exemplary unlocked task dialog 702 is shown. This dialog shows—in contrast to dialog 502 of FIG. 5—that the task is unlocked. Button 504 of FIG. 5 now shows in FIG. 7 an unlocked padlock icon at 704. This difference is also shown with the OK button 506 of FIG. 5 now being selectable, shown at 706 in FIG. 7.

Once the user completes the task or chooses not to perform the task, the user's rights may return to that of the user's limited-rights account. Thus, the user may change the date or time and select the OK button. After this, the task to change the date and time again may be locked.

Figure 8:
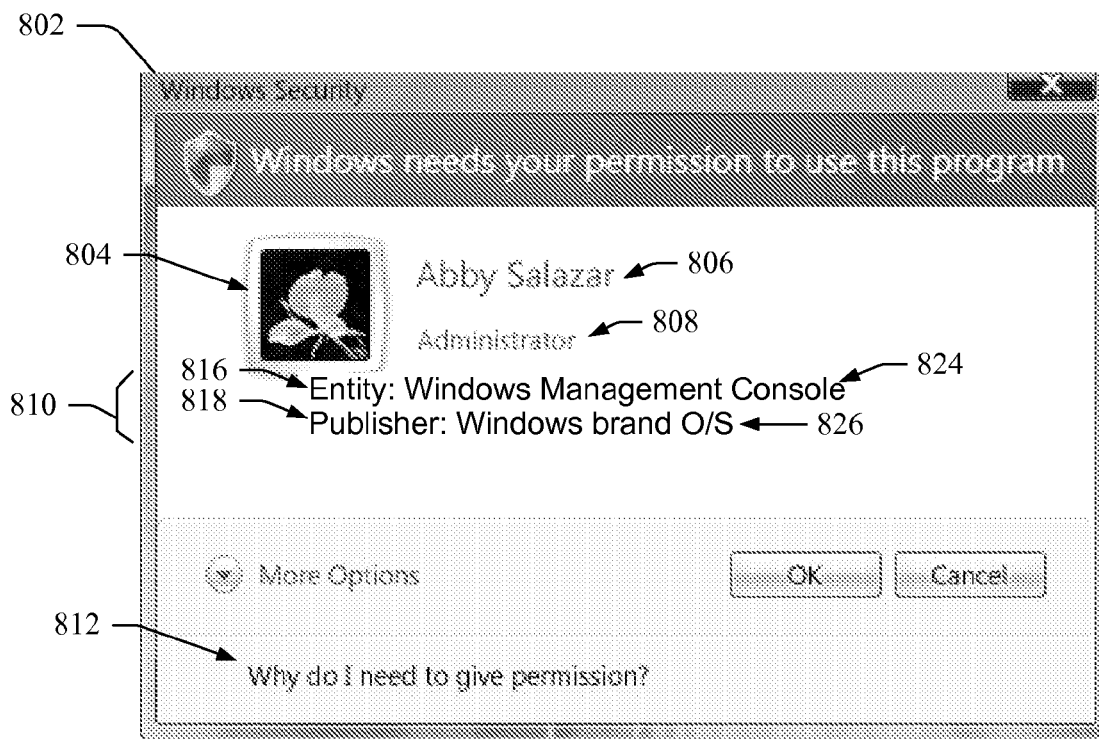
FIGS. 8-11 illustrate exemplary user interfaces which provide task-related information during a rights elevation scenario.

FIGS. 8-11 provide additional examples of graphical user interfaces generated as a result of a rights elevation scenario where task-related information is provided for the user. As will be described below, in these examples, the tools attempt to evaluate gathered task-related information and to provide trustworthy information to the user. These examples are described in the context of a Window-brand operating system, but the skilled artisan should recognize the applicability of the described techniques to other operating system environments. FIG. 8 illustrates an example of exemplary graphical user interface 802 generated resultant to a rights elevation scenario involving a prohibited task. Consider for purposes of example, that user interface 802 is generated resultant to a hypothetical situation where the user attempts to manage operating system functions by running the Windows Management Console feature offered by the Windows brand operating system.

In this embodiment, an account 804 having sufficient rights to permit the prohibited task is shown. Account 804 is an administrator account 806 of user "Abby Salazar" as indicated at 808. User interface 802 provides task-related information relating to the prohibited task which caused the current rights elevation scenario. Specifically, in this instance, interface 802 includes information regions indicated at 810 and 812, though, of course, this is but one configuration. The task-related information can be manifested in various forms within the regions, such as textual and non-textual, for the user.

Information region 810 conveys several pieces of task-related information for the user. A first line relates to the entity 816 requesting the prohibited task. A second line relates to a publisher 818 of the entity. In this particular example, the requesting entity has a user-friendly name of Windows Management Console indicated at 824. Windows Management Console is a feature of, and is published by, the Windows brand O/S as indicated at 826.

Further, information region 812 provides an opportunity for the user to see more task-related information should the user so desire. For instance, the task-related information can include technical details which will aid an expert user in the decision making process. For example, the technical details can include the path to the entity and/or the binary name of the entity, among others.

In this example, the task related information presented to the user indicates that the prohibited task is a legitimate rights elevation scenario. For instance, the entity name of Windows Management Console 824 is consistent with the publisher being the Windows brand operating system 826. In this implementation, the publisher is presented to the user only if the entity has not been altered from its published form. Since the task-related information is trustworthy and consistent with the user's action of attempting to manage the operating system functions, the user may choose to authorize the rights elevation so that the task can be accomplished.

Figure 9:
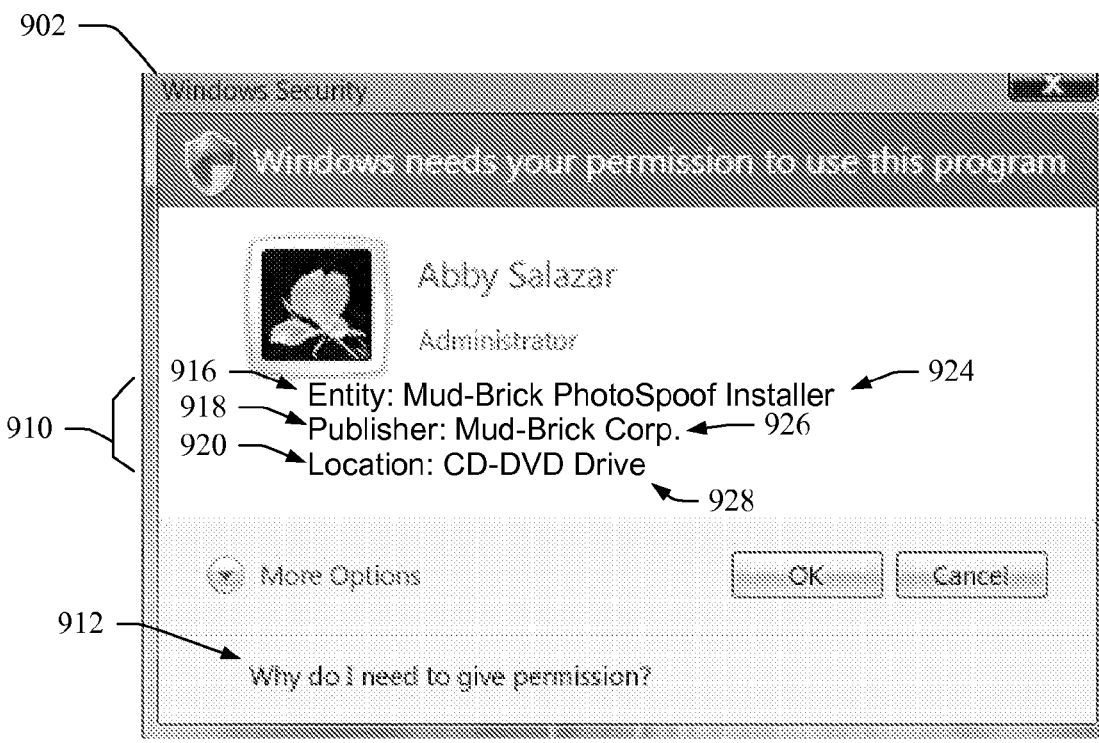

FIG. 9 illustrates another example of an exemplary graphical user interface 902 generated resultant to a rights elevation scenario involving a prohibited task. Assume for purposes of explanation that user interface 902 is generated responsive to a scenario where the user inserts a third party entity (e.g., application) stored on a CD into the computer's CD-DVD drive in an attempt to install the application on the computer. In this instance, assume that the third party entity is a fictitious well-respected entity known as Mud-Brick PhotoSpoof which is deemed by the operating system to be a trustworthy entity. In this instance, third party means other than the operating system. For instance, an application offered by the same company as the operating system can be thought of as a third party entity.

Similar to the configuration of FIG. 8, user interface 902 includes an information region 910. Information region 910 conveys several pieces of task-related information for the user. A first line relates to the entity 916 requesting the prohibited task. A second line relates to a publisher 918 of the entity. A third line provides a location 920 of the requesting entity. In this particular example, the requesting entity is Mud-Brick PhotoSpoof Installer indicated at 924. Mud-Brick PhotoSpoof Installer is published by fictitious Mud-Brick Corp as indicated at 926. The location of the requesting entity is the CD-DVD drive as indicated at 928. Since in this example, the user just placed the Mud-Brick CD in the CD/DVD drive the task-related location information appears consistent with the user's actions. As such the user may choose to authorize the rights elevation so that the task can be accomplished.

Figure 10:
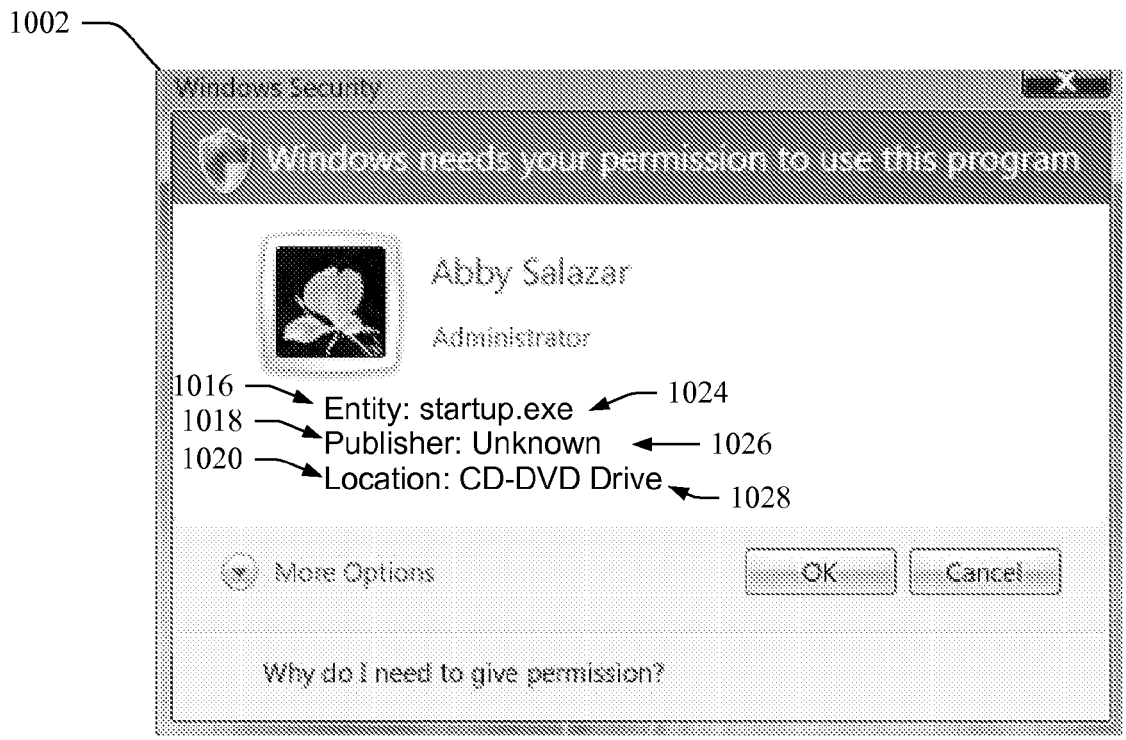

FIG. 10 illustrates another example of an exemplary graphical user interface 1002 generated resultant to a rights elevation scenario involving a prohibited task. Assume for purposes of explanation that user interface 1002 is generated responsive to the user placing a CD for a hypothetical fictitious legacy application that the user has used previously on other computers into the CD-DVD drive in an attempt to install the legacy application onto the computer.

Consistent with the configurations described above in relation to FIGS. 8-9, user interface 1002 contains task related information relating to the entity, publisher, and location at 1016, 1018, and 1020 respectively. In this instance, the task-related information indicates that the legacy application has an unknown publisher. Accordingly, the tools are unable to verify a friendly name for the legacy application so the legacy application is named with information obtained from the legacy application itself In this instance, as indicated at 1024, the entity is named "startup.exe". The entity is indicated as having an unknown publisher at 1026. The location in the CD-DVD drive is indicated at 1028. In this scenario, the task-related information is not necessarily definitive about how safe it is to authorize the prohibited task, but since the user just put the CD into the CD-DVD drive the task-related information is consistent with the user expectations. Further, since the user has previous experience with the application, the user can go ahead and authorize the rights elevation associated with the user interface.

Figure 11:
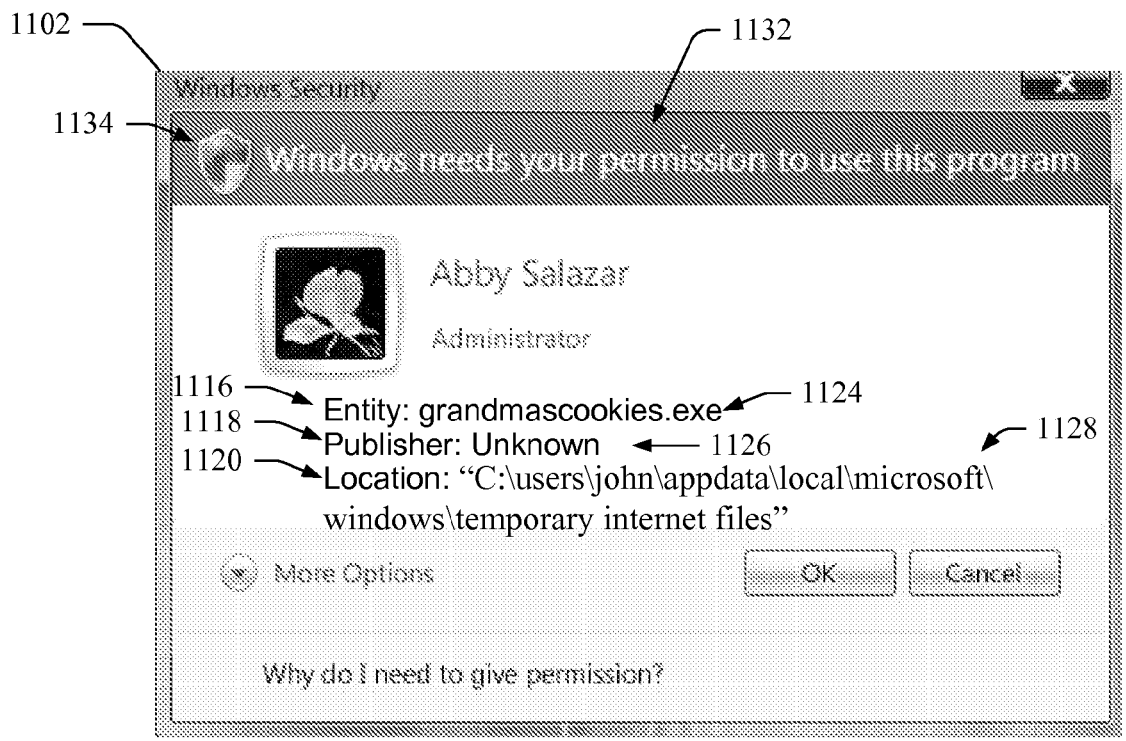

FIG. 11 illustrates still another example of an exemplary graphical user interface 1102 generated resultant to a rights elevation scenario involving a prohibited task. Assume for purposes of explanation that user interface 1102 is generated while a user is surfing the net, but has not intended to download any files. In this context user interface 1102 is generated responsive to a fictitious hypothetical entity called grandmas cookies trying to install itself on the user's computer. Consistent with the configurations described above in relation to FIGS. 8-10, user interface 1102 contains task-related information relating to the entity, publisher, and location at 1116, 1118, and 1120 respectively.

In this instance, the entity grandmas cookies has an unknown publisher. Accordingly, the tools are unable to verify a friendly name for the entity so the entity is named with information obtained from the entity itself. In this case, as indicated at 1124, the entity is named "grandmascookies.exe". The entity is indicated as having an unknown publisher at 1126. The location is indicated at 1128 as "C:\users\john\appdata\local\microsoft\windows\temporary internet files"

In the scenario of FIG. 11, the task-related information is not necessarily definitive about how safe it is to authorize the prohibited task, but since the user did not intend to install any programs from the internet, he/she can be very suspicious of authorizing the requested task.

While not specifically illustrated in FIG. 11, task-related information which is presented to the user that is deemed unreliable and/or of high importance may be highlighted or otherwise represented in a manner to be conspicuous. For instance, in the above example, line 1120 relating to the information that the entity is located in a temporary internet file could be highlighted with red and/or is presented in bold text to bring the fact to the user's attention. Further, as mentioned previously, the general appearance of the user interface may be altered in scenarios where the system evaluation reveals that task-related information is suspect for containing malicious or otherwise deleterious code. For instance, in such a scenario, a general appearance of the user interface may be changed. For example, a background color as indicated at 1132 may be changed, say for example, from green, illustrated in FIG. 11, to for instance, red depending on the degree of trustworthiness of the task-related information presented to the user.

Further configurations may also present some type of summary of the system's evaluation of the task-related information. For instance, the user-interface could present a phrase such as "This rights elevation scenario is associated with highly trusted information" or "This rights elevation scenario has a high probably of being associated with potentially malicious code which may harm your computer!". Another example, as mentioned above, may involve the use of symbols. For instance, the graphical user interface 1102 of FIG. 11 contains a symbol 1134 in the form of a shield. In one configuration, the shield icon will be different based upon whether the task is a task native to the operating system or comes from a trustworthy or untrustworthy source. Another variation might show the symbol when the presented task-related information is deemed trustworthy and not shown and/or a different symbol shown when the task-related information is deemed untrustworthy. The skilled artisan should recognize other variations for presenting task-related information to the user in a manner which aids the user in deciding whether to authorize the rights elevation and ultimately to allow the prohibited task.

Exemplary Techniques

Figure 12:
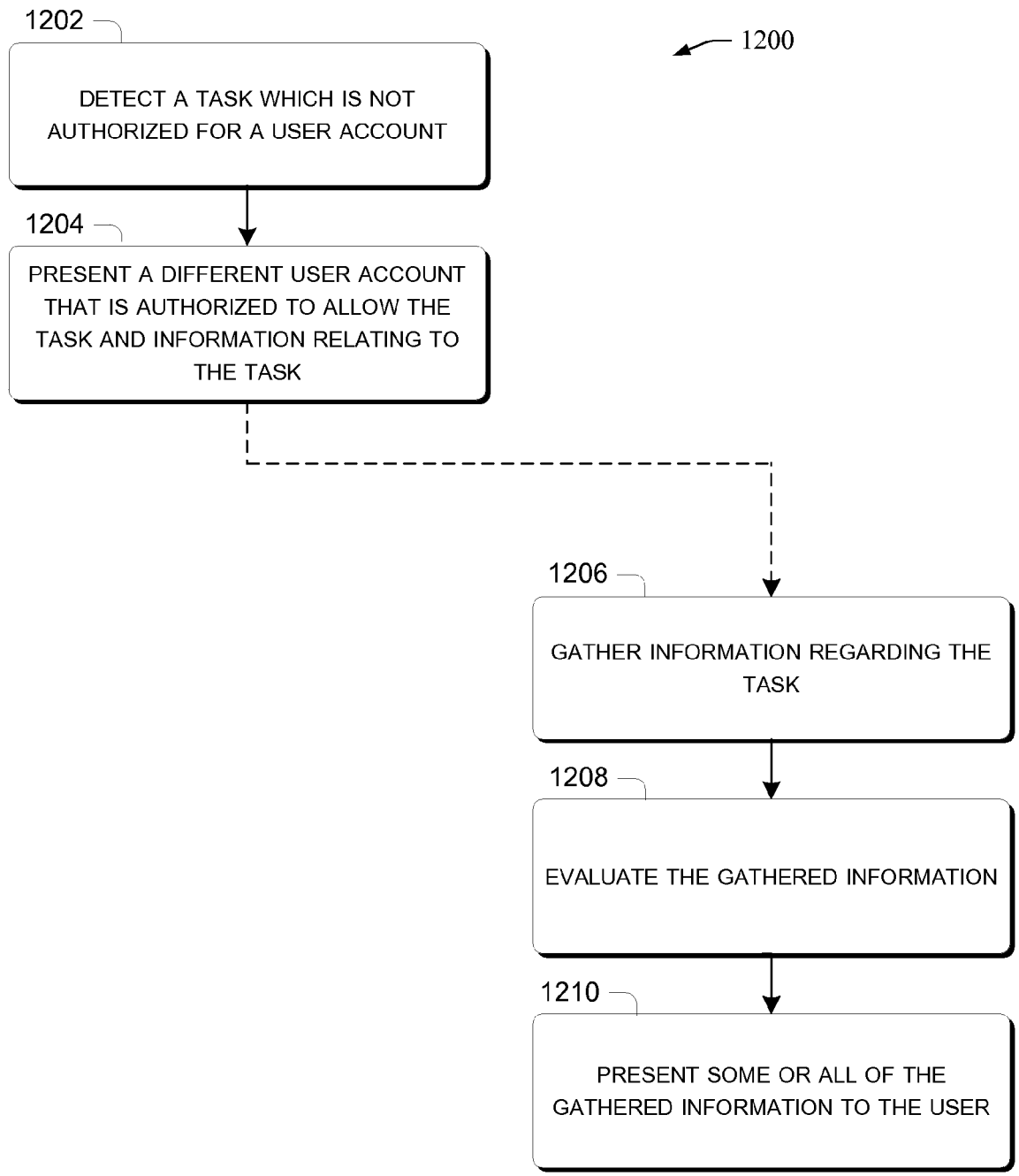
FIG. 12 illustrates a flow diagram of an exemplary technique for providing task-related information during a rights elevation scenario.

FIG. 12 illustrates an exemplary technique 1200 related to presenting a user interface responsive to a rights elevation scenario in accordance with one embodiment. Blocks 1202 and 1204 describe an example of one basic technique for presenting the user interface. Blocks 1206-1210 illustrate but one example that accomplishes the technique of block 1204. The order in which the process is described is not intended to be construed as a limitation, and any number of the described process blocks can be combined in any order to implement the process. Furthermore, the process can be implemented in any suitable hardware, software, firmware, or combination thereof.

At block 1202, the technique detects a task which is not authorized for a user account. For instance, the task may be one which only an "administrator" can authorize. Various examples of such tasks are described above.

At block 1204, the technique presents a different user account that is authorized to allow the task and information relating to the task. A single user account may be presented in some circumstances, while in other circumstances multiple user accounts which can authorize the prohibited task may be presented. The user may select one of the multiple user accounts to authorize if he/she so chooses.

The information relating to the proposed or prohibited task can be any information which may be useful to the user in deciding whether to indirectly allow the proposed task by authorizing the different user account. Some techniques gather whatever information is available regarding the task and present the information to the user, such as via a graphical user interface. Other techniques attempt to evaluate the information in some manner in order to further assist the user in the decision making process. One such exemplary technique is described below in relation to blocks 1206-1210.

At block 1206, the technique gathers information regarding the task. Examples of such information can include, but are not limited to, information about the entity requesting the prohibited task or otherwise related to the prohibited task, and a location of the entity. Other examples can include whether a publisher of the entity is known, whether the entity is signed and authenticated via a certificate, and whether the entity contains any known malicious code, among others.

At block 1208, the technique evaluates the gathered information. The evaluation can serve to establish trustworthiness of various portions of the information. Evaluating may be as simple as assigning a higher trustworthiness to information obtained from a third party than from the entity itself. Such evaluation is based on the presumption that the entity has less influence upon information obtained from other sources than from information that the entity itself supplies. Other examples of evaluating can include evaluating a hash of the entity compared to an original hash of the entity's publisher. The skilled artisan should recognize other techniques for evaluating the information. In some instances, the information can be ranked from a highest degree of trustworthiness to a lowest degree of trustworthiness.

At block 1210, the technique presents some or all of the gathered information to the user to aid the user in determining whether to authorize the task. Some techniques, attempt to present only information having a pre-established degree of trustworthiness to the user. For instance, such techniques may not present any information to the user which was obtained from the entity itself. In another example, if information obtained about the entity falls below the pre-established threshold such techniques may default to excluding the failing information and present other information instead. For instance, if the only gathered information about the entity name is from the entity itself such techniques may display the location of the entity at the exclusion of the rejected information. The above described techniques can provide information to the user to aid the user in making a determination to allow a prohibited task.

CONCLUSION

Systems and/or methods are described that enable a user to elevate his or her rights, including through a user interface identifying an account with these rights. The systems and methods can further provide information on the user interface relating to a task that requires the rights elevation. This information can aid the user in making a decision whether to authorize the rights elevation. By so doing, these systems and/or methods may permit a user to use a computer in relative safety from attacks by malicious code while also enabling the user to make an informed decision to elevate his or her rights or to choose not to elevate the rights in a given scenario. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable media, wherein the computer-readable media excludes signals, the computer-readable media having computer-readable instructions therein that, when executed by a computing device, cause the computing device to present a user interface, the user interface comprising:

a graphical user interface component presented in response to a task being prohibited based on a current account not having a right to permit the task;

the graphical user interface component, without user interaction, simultaneously including:

a plurality of identifiers identifying different accounts having a right to permit the task;

an authenticator region capable of receiving, from a user, an authenticator usable to authenticate a selected different account having the right to permit the task; and an information region programmed to present task-related information which the user may rely upon in making a decision as to whether to authenticate the different account and thereby permit the task;

the computer-readable instructions therein further, when executed by the computing device, cause the computing device to perform operations comprising:

gathering the task-related information from a plurality of sources, wherein the same types of the information are gatherable from more than one source;

evaluating the gathered task-related information to define a sub-set that contains one representative of at least one of the types of the information; and where the graphical user interface component presented includes the sub-set of the gathered information based upon said evaluating and not presenting the gathered information that is not a part of the sub-set defined during the evaluating.

2. The computer-readable media of claim 1, wherein the information region comprises a non-textual region for conveying a trustworthiness rank of the task-related information based at least on a source of the task-related information.

3. The computer-readable media of claim 2, wherein the non-textual region comprises one of:

a first color corresponding to a higher trustworthiness rank and a second color corresponding to a lower trustworthiness rank.

4. The computer-readable media of claim 1, wherein the task-related information indicates the task, an entity that requested or attempted the task, a publisher of the entity, and a location of the entity.

5. One or more computer-readable media, wherein the computer-readable media excludes signals, the computer-readable media having computer-readable instructions therein that, when executed by a computing device, cause the computing device to perform acts comprising:

detecting a task which is not currently authorized for a user account;

gathering information relating to the task from a plurality of sources, types of the information gathered including the task, an entity attempting to implement the task, and a publisher of the entity wherein the same types of the information are gatherable from more than one source;

evaluating the gathered information to define a sub-set that contains one representative of at least one of the types of the information;

presenting a different user account that is authorized to allow the task; and presenting information relating to the task comprising the sub-set of the gathered information based upon said evaluating and not presenting the gathered information that is not a part of the sub-set defined during the evaluating.

6. The media of claim 5, wherein the presenting information comprises presenting a location of the entity attempting to implement the task.

7. The media of claim 5, where the evaluating comprises evaluating the information to determine a trustworthiness rank of the gathered information.

8. The media of claim 7, wherein the presenting comprises presenting gathered information ranked higher than other gathered information.

9. The media of claim 7, wherein the presenting comprises presenting the gathered information along with an indication of the trustworthiness rank of the presented information.

10. The media of claim 9, wherein the presenting an indication comprises presenting a symbol selected from a group of symbols associated with types of entities which could request rights elevation.

11. The media of claim 9, wherein the presenting an indication comprises presenting a colored background selected from a group of colored backgrounds associated with the trustworthiness rank.

12. The media of claim 7, wherein the presenting comprises presenting the sub-set which satisfies a pre-established trustworthiness rank.

13. The media of claim 7, wherein the presenting comprises further presenting a summarized statement regarding the trustworthiness rank of the sub-set.

14. A method comprising:
   detecting, by a computer, a rights elevation scenario involving a task;
   gathering task-related information, by a task-related information aggregator on the computer, from a plurality of sources, wherein information of the same types are gatherable from more than one source;
   evaluating the gathered task-related information to define a sub-set that contains one representative of at least one of the types of the information; and
   ranking, by the computer, the information gathered relating to the task based at least on whether an entity requesting the task:
      has a known publisher,
      is signed, and
      is authenticated;
   packaging, by the computer, the information relating to the task to convey a trustworthiness ranking of the information; and
   presenting, by the computer, the information relating to the task with an indication of the trustworthiness ranking of the information, wherein:
      the presenting comprises presenting the most highly ranked information; and
      the information relating to the task comprises information relating to:
         the entity requesting the task,
         a location of the entity requesting the task, and
         the publisher of the entity requesting the task
      the presenting comprises presenting the sub-set of the gathered information based upon said evaluating and not presenting the gathered information that is not a part of the sub-set defined during the evaluating.

15. The media of claim 5, wherein presenting information relating to the task comprises presenting an indication of trustworthiness rank based at least on a type of entity requesting rights elevation and information gathered from one or more sources.

16. The media of claim 5, wherein presenting information relating to the task comprises:
   presenting the sub-set of the gathered information along with an indication of the trustworthiness rank of the sub-set of the information gathered.

17. The computer-readable media of claim 5, wherein:
   the evaluating comprises generating a trustworthiness ranking the information gathered relating to the task based at least on whether an entity requesting the task:
      has a known publisher,
      is signed, and
      is authenticated; and
   the presenting the information relating to the task including an indication of the trustworthiness ranking of the information, wherein the information relating to the task comprises:
      the entity attempting to implement the task,
      a location of the entity attempting to implement the task, and
      the publisher of the entity attempting to implement the task.

* * * * *